March 25, 1930.  A. M. NIVEN  1,752,021
METHOD OF MANUFACTURE OF SLEEVE VALVES
Original Filed July 17, 1927   2 Sheets-Sheet 1

INVENTOR.
Archie Macphail Niven
BY
W. W. Harris
ATTORNEY.

March 25, 1930. A. M. NIVEN 1,752,021
METHOD OF MANUFACTURE OF SLEEVE VALVES
Original Filed July 17, 1927 2 Sheets-Sheet 2
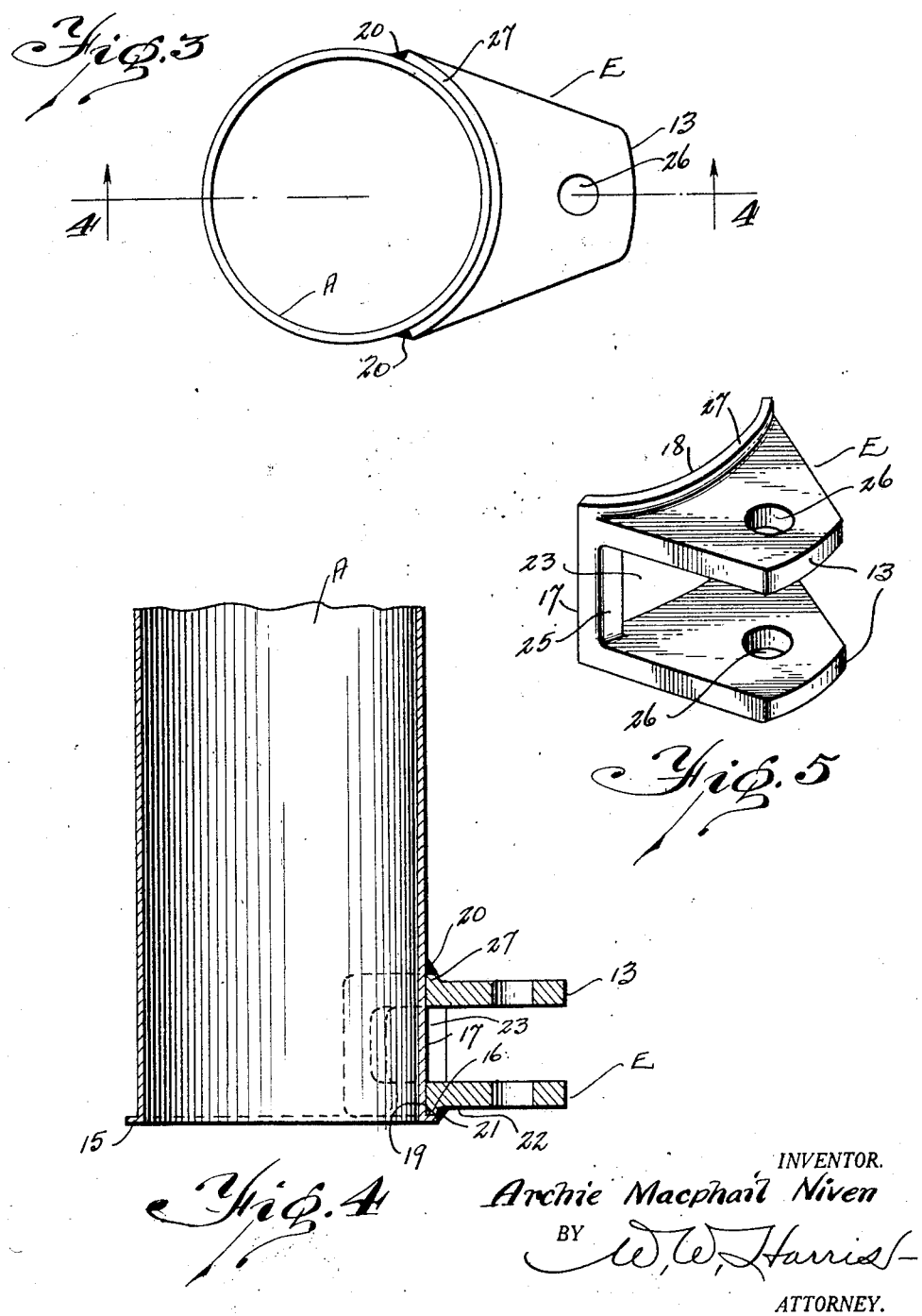

Patented Mar. 25, 1930

1,752,021

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

METHOD OF MANUFACTURE OF SLEEVE VALVES

Original application filed July 17, 1927, Serial No. 205,973. Divided and this application filed August 23, 1928. Serial No. 301,444.

This invention relates to internal combustion engines and refers more particularly to an improved method for manufacturing sleeve valves. My invention relates primarily to the single sleeve valve engine and particularly, though not necessarily so limited, to the type where the sleeve is moved in a combined reciprocating and oscillating path with respect to the sleeve and cylinder axis whereby the sleeve and cylinder ports are caused to function in the well known manner.

Heretofore such sleeve valves have been generally made of cast iron, especially where the valves are driven by a link mechanism operated by a valve layshaft. Steel sleeves or sleeves constructed of materials having the general characteristics of steel as distinguished from cast iron have been used in many types of sleeve valve engines and my invention embodies an improved method of manufacture for this type of sleeve valve. It is known that steel sleeves may be made much lighter than cast iron sleeves, thus reducing the inertia forces incident to operating the engine. Difficulty has been experienced, however, in suitably and conveniently securing the driving lug or other sleeve driving means to the steel sleeve valve. Such a problem does not arise in the use of cast iron sleeves since such lugs or driving means may be cast integrally with the sleeves. A further difficulty experienced in connection with the use of steel sleeves resides in conveniently reinforcing the lower end of the sleeve. The steel sleeve due to its thinness is generally reinforced to prevent undue twisting and distortion. Here again, where such reinforcing is desirable in a cast iron sleeve, a reinforcing annular band or bands may be conveniently cast with the sleeve.

I have provided a method whereby a steel sleeve valve may be conveniently and cheaply manufactured, overcoming the difficulties experienced in the past. By reason of my method the steel sleeve and driving lug are securely united together by welding, my invention providing a weld of good efficiency.

This application is a division of my copending application Ser. No. 205,973 filed July 17, 1927.

With the foregoing and other objects in view my invention resides in the novel method more particularly hereinafter described and claimed.

Figure 1:
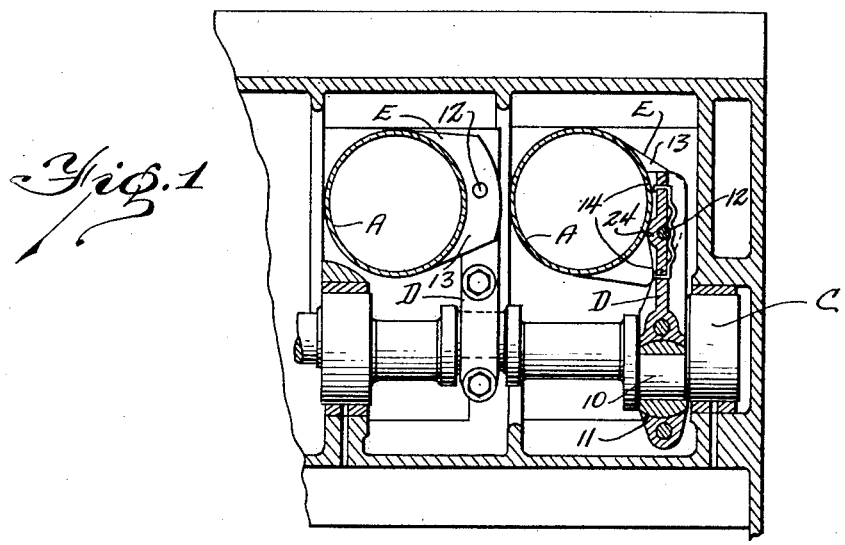
Figure 2:
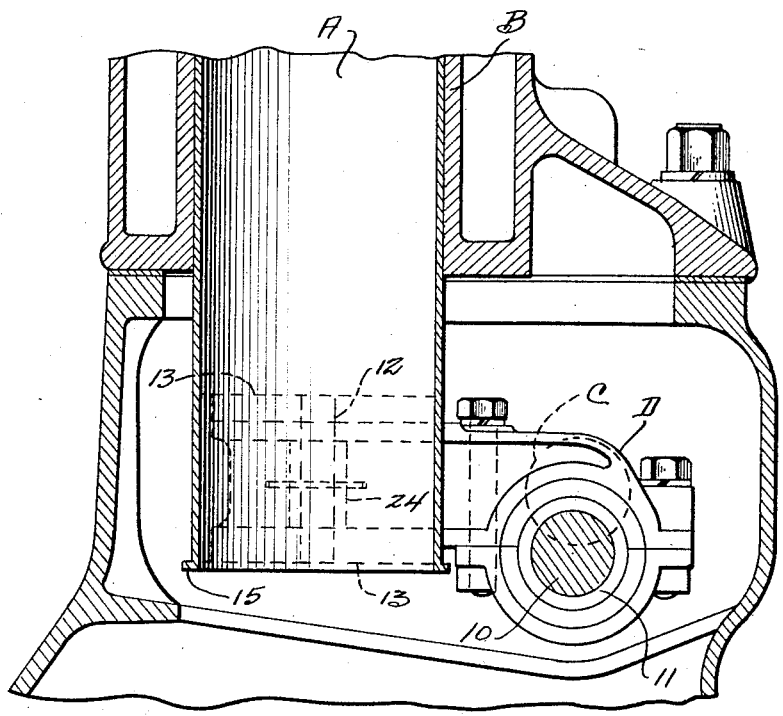

Referring to the accompanying drawings in which like reference characters indicate corresponding parts throughout the several views, Fig. 1 is a plan view in cross section of a portion of an engine showing the sleeve valves and driving means therefor, Fig. 2 is a sectional elevation through a typical sleeve valve, Fig. 3 is a plan view of the lug and sleeve assembly, Fig. 4 is a detail sectional view through 4—4 of Fig. 3, and Fig. 5 is a perspective view of the lug shown in Figs. 3 and 4.

In the drawings reference character A represents the sleeve valves operable within cylinder B, the sleeves and cylinders having the usual ports (not shown) for controlling the cyclic events of the engine. The sleeves may be driven in various manners, that shown comprising the valve layshaft C having cranks 10 which may operate the links D through a ball and socket connection 11 to permit the slight side swing of the links. The links D may be constrained to move parallel to themselves by connection through a pivot pin 12 between the ears 13 of sleeve driving lug E and if desired the link face next to the sleeve may be recessed in arcs 14 conforming with the sleeve contour whereby the pivot pin 12 may be positioned closer than otherwise to the sleeve valve. Thus the sleeve valve is moved in a combined reciprocating and oscillating path, the usual piston (not shown) operating within each sleeve valve for each cylinder of the engine.

Referring particularly to Figs. 3, 4, and 5 the sleeve A is constructed of relatively thin steel tubing or other suitable material affording the necessary strength and resistance to rupture and distortion. Such tubing may be drawn, rolled or prepared in any convenient manner. I then preferably spin or roll over the lower edge to form the annular flange 15 which will stiffen the lower portion of the sleeve and prevent its twisting and distortion. The lug E is then secured in position preferably by welding at 20 between the sleeve and lug edges 17 and 18, and also at 21 between the flange 15 and adjacent lug face 22, the lower edge 19 of the lug resting in the corner formed by the flange 15. The flange 15 affords an efficient welding connection with the lug it being well known that two materials will best weld when they are parallel, or substantially so, as distinguished from a right angular relative position. The flange 15 serves at the same time as a stiffening means for the sleeve. Furthermore the flanges 16 and 27 of the lug are preferably substantially equal to the thickness of the sleeve, thus providing a highly efficient welding connection with the sleeve. The flange 27 being of substantially the same thickness of the sleeve valve and parallel thereto thus offers an efficient welding connection.

The lug E may be cut away at 23 to permit close positioning of the pivot pin 12 to the sleeve valve since otherwise the link pivot pin boss 24 would interfere with the driving lug rear wall requiring the pivot pin to be moved further away from the sleeve. Thus the lug E is formed with ears 13 connected by bridges 25, aligned openings 26 in the ears receiving the pivot pin 12. The lugs E may be conveniently drop forged or stamped from sheet metal, and where the former method is employed the lugs may be forged in the form of an annular band with annular spaced flanges, and then segmentally cut to form the lugs as shown in Fig. 5.

Since the general practice in engines of the character described is to proportion the ports so that a portion of the piston leaves the lower end of the sleeve valve during a portion of its travel, it is advisable to avoid sleeve deflected portions which might allow expansion of the piston rings into such deflected portions and the illustrated embodiment of my invention will meet such requirements.

What I claim as my invention is:

1. The method of manufacturing a sleeve valve provided with a driving lug for internal combustion engines consisting in deforming the sleeve by extending a portion thereof outwardly from the sleeve, and welding a portion of a sleeve driving lug to said outwardly extending sleeve portion.

2. The method of producing a tubular sleeve valve with a driving lug consisting in forming the sleeve with a portion deflected outwardly therefrom, and welding to said deflected portion a portion of a sleeve lug having a cross sectional thickness substantially equal to that of the deflected sleeve portion.

3. The method of making tubular sleeve valves with attached driving lugs consisting in the steps of deflecting outwardly from the sleeve an annular portion thereof suitable for stiffening the lower circumferential end of the sleeve, and attaching the sleeve lug to the sleeve by welding a portion of the lug to the outwardly deflected sleeve portion.

4. The method of manufacturing a sleeve valve provided with a driving element for internal combustion engines consisting in forming abutting flanges of substantially equal thickness on the sleeve and driving element to provide an efficient weld, and welding the abutting flanges to secure the driving element to the sleeve valve.

5. The method of making tubular sleeve valves with attached lugs consisting in deforming the sleeve by deflecting the lower peripheral edge outwardly to form an annular flange about the lower circumferential edge of the sleeve, and welding a portion of a sleeve driving lug to a portion of said annular sleeve flange.

In witness whereof, I hereunto subscribe my name this 20th day of August, A. D. 1928.

ARCHIE MACPHAIL NIVEN.